United States Patent
Welchman (10) Patent No.: US 8,769,497 B2
(45) Date of Patent: Jul. 1, 2014

(54) SYSTEM AND METHOD FOR USE IN INDICATING EXECUTION OF APPLICATION CODE

(75) Inventor: Dan Welchman, Ely (GB)

(73) Assignee: General Electric Company, Schenectady, NY (US)

( * ) Notice: Subject to any disclaimer, the term of this patent is extended or adjusted under 35 U.S.C. 154(b) by 341 days.

(21) Appl. No.: 12/839,726

(22) Filed: Jul. 20, 2010

(65) Prior Publication Data

US 2012/0023482 A1 Jan. 26, 2012

(51) Int. Cl.
*G06F 9/44* (2006.01)
*G06F 9/45* (2006.01)

(52) U.S. Cl.
USPC ............ 717/125; 717/124; 717/127; 717/151

(58) Field of Classification Search
None
See application file for complete search history.

(56) References Cited

U.S. PATENT DOCUMENTS

| | | | |
|---|---|---|---|
| 5,446,838 A | 8/1995 | Kimelman | |
| 5,448,739 A | 9/1995 | Jacobson | |
| 5,659,679 A | 8/1997 | Alpert et al. | |
| 6,079,032 A | 6/2000 | Peri | |
| 6,223,144 B1 | 4/2001 | Barnett et al. | |
| 6,356,858 B1 | 3/2002 | Malka et al. | |
| 6,481,008 B1 | 11/2002 | Chaiken et al. | |
| 6,668,372 B1 | 12/2003 | Wu | |
| 6,848,100 B1 | 1/2005 | Wu et al. | |
| 7,292,970 B1 | 11/2007 | Hurlock | |
| 7,296,261 B2 | 11/2007 | Witchel et al. | |
| 7,433,852 B1 | 10/2008 | Bertrand et al. | |
| 7,503,037 B2 | 3/2009 | Banerjee et al. | |
| 7,653,899 B1 | 1/2010 | Lindahl et al. | |
| 7,707,555 B2 * | 4/2010 | Spertus et al. | 717/127 |
| 7,926,041 B2 * | 4/2011 | Dimpsey et al. | 717/127 |
| 8,171,457 B2 * | 5/2012 | Dimpsey et al. | 717/125 |
| 8,219,980 B2 | 7/2012 | Bates et al. | 717/129 |
| 8,429,617 B2 * | 4/2013 | Demetriou et al. | 717/124 |
| 8,627,287 B2 * | 1/2014 | Fanning et al. | 717/124 |
| 2002/0095660 A1 * | 7/2002 | O'Brien et al. | 717/127 |
| 2004/0205720 A1 | 10/2004 | Hundt | |
| 2005/0028036 A1 | 2/2005 | Shibata | |
| 2005/0071818 A1 | 3/2005 | Reissman et al. | |
| 2005/0081107 A1 * | 4/2005 | DeWitt et al. | 714/38 |
| 2005/0172271 A1 * | 8/2005 | Spertus et al. | 717/125 |
| 2005/0210452 A1 * | 9/2005 | Dimpsey et al. | 717/120 |

(Continued)

FOREIGN PATENT DOCUMENTS

EP 307075 A2 3/1989

OTHER PUBLICATIONS

Buse et al., The road not taken: Estimating path execution frequency statically, May 2009, 11 pages.*

(Continued)

*Primary Examiner* — Thuy Dao
(74) *Attorney, Agent, or Firm* — Armstrong Teasdale LLP (57) ABSTRACT

A method for use in indicating an execution of application source code. Application object code is generated based on application source code. The application object code includes a plurality of object code portions of interest corresponding to a plurality of source code portions of interest within the application source code. For each execution of an object code portion of interest, an execution event is associated with the corresponding source code portion of interest. Source code portions of interest may be assigned an execution frequency based on a quantity of associated execution events.

20 Claims, 7 Drawing Sheets

(56) References Cited

U.S. PATENT DOCUMENTS

| | | |
|---|---|---|
| 2006/0225051 A1 | 10/2006 | Kannan |
| 2007/0074168 A1* | 3/2007 | Bates et al. .................. 717/124 |
| 2007/0168998 A1 | 7/2007 | Mehta et al. |
| 2007/0300213 A1* | 12/2007 | Adolphson et al. ........... 717/151 |
| 2008/0320448 A1* | 12/2008 | Dimpsey et al. .............. 717/125 |
| 2009/0044177 A1* | 2/2009 | Bates et al. .................. 717/131 |
| 2009/0144698 A1* | 6/2009 | Fanning et al. ............... 717/120 |
| 2009/0222786 A1 | 9/2009 | Malcolm |
| 2009/0282294 A1* | 11/2009 | Edwards ........................ 714/45 |
| 2010/0135472 A1 | 6/2010 | Watanabe et al. |
| 2010/0153883 A1 | 6/2010 | Lee et al. |
| 2011/0078666 A1 | 3/2011 | Altekar |
| 2012/0204164 A1* | 8/2012 | Castanos et al. .............. 717/153 |

OTHER PUBLICATIONS

Bond et al., Practical Path Profiling for Dynamic Optimizers, Mar. 2005, 12 pages.*

Search Report and Written Opinion from EP Application No. 11173928.0 dated Nov. 17, 2011.

Wikipedia Contributors, HP WinRunner, May 10, 2010, 2 pages, Wikipedia, The Free Encyclopedia.

Search Report and Written Opinion from corresponding EP Application No. 11173987.2-2211 dated Dec. 6, 2011.

Pfahler et al., "Cate: A System for Analysis and Test of Java Card Applications", Workshops on Testing of Component-Based Systems and SoftwareQuality, pp. 157-163, Oct. 1, 2004.

* cited by examiner

Source code viewer

```
_pragma(classify_level=restricted)
_private swaf_network_analysis_dialing.rwo_string(r)

returns a string to represent the rwo R

9 |    _en << r.external_name
  9 |    str << ""
  9 |    vngf << r.visible_non_geometry_fields
  9 |    i << 0
  9 |    _for f _over vngf.fast_elements()
        _loop
198 |      _if ~f.is_simple_value?  _then  _continue  _endif
171 |      _if ~f.type.is_string?  _then  _continue  _endif
 45 |      val << r.perform(f.name)
 45 |      _if val _is_unset _then _continue _endif
 27 |      str << str + "," + val
        _endLoop
  9 |    _if str = ""
        _then
  9 |      str << str.slice_to_end(2)
  9 |      _return str.concatenation(en."(",str,")")
```

FIG. 7

SYSTEM AND METHOD FOR USE IN INDICATING EXECUTION OF APPLICATION CODE

BACKGROUND OF THE INVENTION

The subject matter disclosed herein relates generally to application source code management and, more specifically, to systems and methods for use in detecting and indicating the execution of human-readable source code.

At least some known computer systems use test code to automatically execute application code based on predefined inputs and expected outputs. Furthermore, some known systems track application code execution during testing and produce statistics and/or reports that indicate what portion or portions of source code was executed. Such reports may be referred to as "code coverage reports."

Generally, known execution tracking systems and execution tracking methods require modifications and/or additions to the application code. However, making modifications or additions to application code requires an investment of time and may negatively affect the execution speed and/or the behavior of an associated application. As a result, testing may be delayed. Furthermore, depending on the severity of the adverse effects to the application, known tracking systems may be considered unfit for use in a live or "production" context, where execution speed is critical. Also, additional delays may be incurred waiting for the code coverage report, as such reports are produced only when the execution of all test code is complete.

Moreover, existing systems may also depend on a static, pre-execution definition of portions of interest within the application code, and thus such systems require a user to terminate and re-execute an application to enable the portions of interest for which execution is tracked to be modified. Furthermore, existing methods are limited to only indicating whether a portion of code was executed in a binary fashion and are not capable of distinguishing between seldom-executed and often-executed code.

BRIEF DESCRIPTION OF THE INVENTION

This Brief Description is provided to introduce a selection of concepts in a simplified form that are further described below in the Detailed Description. This Brief Description is not intended to identify key features or essential features of the claimed subject matter, nor is it intended to be used as an aid in determining the scope of the claimed subject matter.

In one aspect, a system for use in indicating an execution of application source code is provided. The system includes an input interface configured to receive an indication of a source code portion of interest within the application source code. The application source code includes at least a plurality of human-readable statements that describe a plurality of operations. The system also includes a processor that is coupled to the input interface and programmed to generate application object code based on the application source code. The application object code includes at least a plurality of computer executable instructions and an object code portion of interest corresponding to the source code portion of interest. The processor is also programmed to execute the application object code and to associate an execution event with the corresponding source code portion of interest in a memory device for each execution of the object code portion of interest.

In another aspect, a system for use in indicating an execution of application source code is provided. The system includes a memory device configured to store application source code and application object code. The application source code includes at least a plurality of human-readable statements that describe a plurality of operations, and the application object code includes at least a plurality of computer executable instructions corresponding to the plurality of human-readable statements. The system also includes a processor that is coupled to the memory device and programmed to determine an object code portion of interest corresponding to each source code portion of interest of a plurality of source code portions of interest within the application source code. The processor is also programmed to execute the application object code and to associate an execution event with the corresponding source code portion of interest in said memory device for each execution of each object code portion of interest.

In yet another aspect, a method for use in indicating an execution of application source code that includes a plurality of source code portions of interest is provided. The method includes defining a plurality of execution frequencies corresponding to a range of execution event quantities. Application object code is generated by a processor based on the application source code. The application object code includes at least a plurality of computer executable instructions and a plurality of object code portions of interest corresponding to a plurality of source code portions of interest. The application object code is executed by the processor. An execution event is associated with the corresponding source code portion of interest in a memory device by the processor for each execution of an object code portion of interest. An execution frequency is associated with each source code portion of interest by the processor based on a quantity of execution events associated with the source code portion of interest.

BRIEF DESCRIPTION OF THE DRAWINGS

The embodiments described herein may be better understood by referring to the following description in conjunction with the accompanying drawings.

DETAILED DESCRIPTION OF THE INVENTION

The embodiments described herein provide an indication of whether application source code has been executed in object code form. Specifically, in some embodiments, during execution of an application, portions of interest within the application source code are identified. Application object code that is generated from the application source code includes portions of interest that correspond to the portions of interest within the application source code. As the application object code is executed, when an object code portion of interest is executed, an execution event is recorded for the corresponding source code portion of interest. For example, execution events may be recorded by incrementing an execution counter and/or by storing a discrete event (e.g., including a timestamp) for each execution. The execution of one or more source code portions of interest is indicated based on the recorded execution events.

As used herein, the term "application source code" includes human-readable statements describing operations capable of being performed by a computer. A single statement is sometimes referred to as a "line of code" or simply a "line", regardless of the quantity of lines used to represent the human-readable statement in a displayed or printed form. A collection of functionally related statements may be grouped into a method (also known as a function). Related methods may be grouped into a class, and related classes may be grouped into a package or module. An application or a library, for use by an application, may include application source code in multiple packages. Application source code may be stored in one or more files in a memory device. For example, each class may correspond to one file.

Application object code including computer-executable instructions is generated from application source code. For example, application source code may be compiled and/or translated to create application object code. The computer-executable instructions of the application object code correspond to the human-readable statements of the application source code. Unlike human-readable statements, computer-executable instructions are executable directly by a processor of a computer and/or by a "virtual machine" that is executed by such a processor. In addition to human-readable statements, application source code may include content, such as comments, preprocessing directives, and/or annotations, that is not directly generated into application object code for execution by a processor and/or a virtual machine.

Embodiments are described herein with regard to portions of interest within application source code and application object code. A source code portion of interest may include a human-readable statement, a method, a class, and/or a package. An object code portion of interest includes one or more computer-executable instructions corresponding to a source code portion of interest.

In operation, a processor executes a software program and/or application by executing application object code. During execution of application object code, the execution of a particular object code portion of interest may be monitored and/or detected. In an exemplary embodiment, an execution breakpoint is associated with (e.g., inserted before) a computer-executable instruction of an object code portion of interest. The processor halts execution of the application object code at the execution breakpoint, and another application, known as a monitoring utility, becomes aware of the execution of the object code portion of interest. For example, the processor may be programmed to notify the monitoring utility that the execution breakpoint has been reached, or the monitoring utility may repeatedly request or "poll" for execution information from the processor. The monitoring utility associates an execution event with the object code portion of interest and directs the processor to continue executing the application object code. While described as using execution breakpoints, embodiments provided herein are operable with any means for detecting and/or monitoring execution of an object code portion of interest, including, without limitation, modifying (e.g., instrumenting) the application object code to include and/or reference computer-executable statements for generating execution events.

An exemplary technical effect of the methods, systems, and apparatus described herein includes at least one of (a) receiving, via an input interface, an indication of a plurality of source code portions of interest within application source code; (b) generating, by a processor, application object code based on the application source code, wherein the application object code includes a plurality of computer-executable instructions and a plurality of object code portions of interest corresponding to the source code portions of interest; (c) associating, by the processor, an execution breakpoint with each object code portion of interest of the plurality of object code portions of interest; and (d) for each execution breakpoint, when the associated object code portion of interest is executed, disabling the execution breakpoint and associate an execution event with the source code portion of interest corresponding to the object code portion of interest in a memory device.

Figure 1:
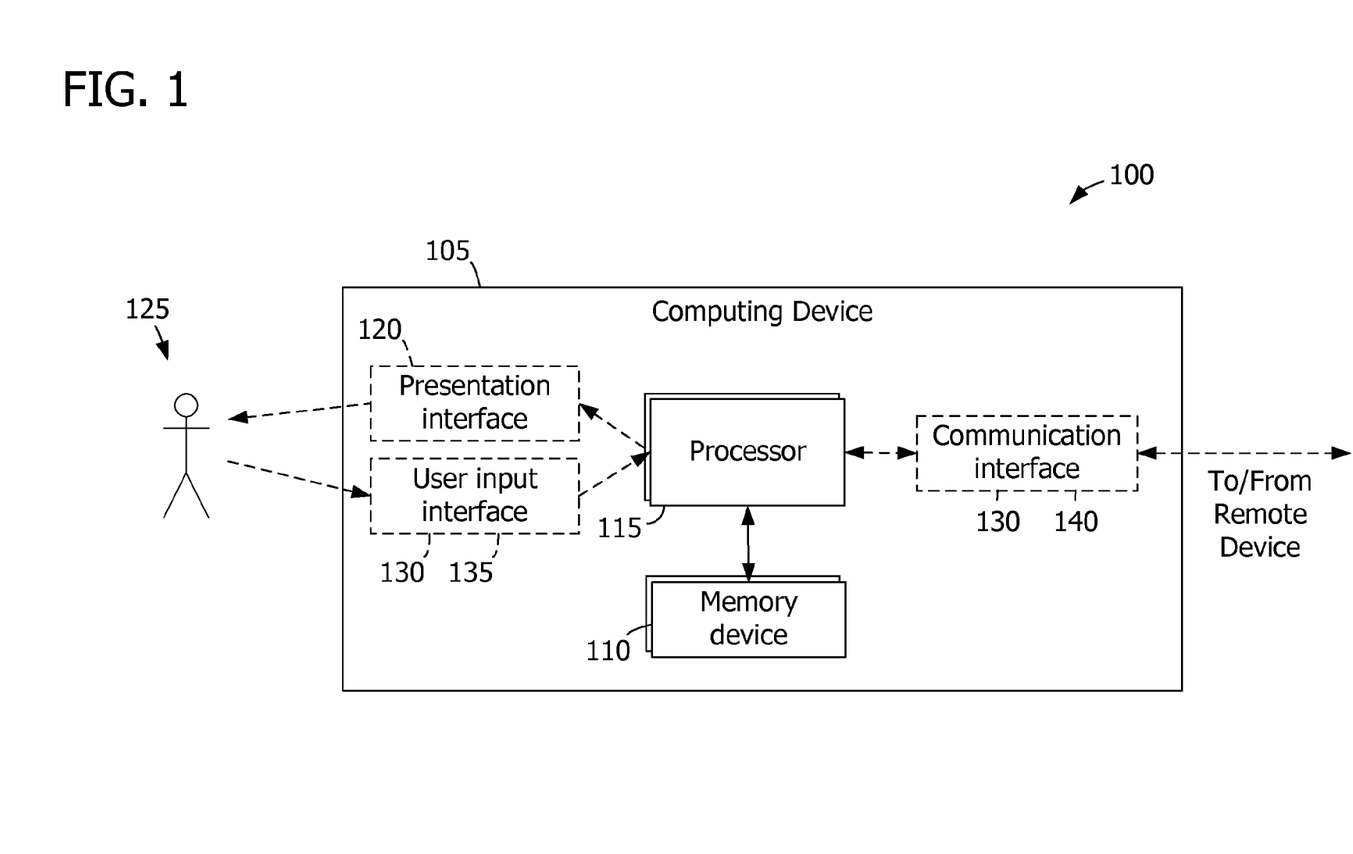
FIG. 1 is a block diagram of an exemplary computing device.

FIG. 1 is a block diagram of an exemplary computing device 105. Computing device 105 includes a memory device 110 and a processor 115 coupled to memory device 110 for executing instructions. In some embodiments, executable instructions are stored in memory device 110. Computing device 105 is configurable to perform one or more operations described herein by programming processor 115. For example, processor 115 may be programmed by encoding an operation as one or more executable instructions and providing the executable instructions in memory device 110. Processor 115 may include one or more processing units (e.g., in a multi-core configuration).

Memory device 110 is one or more devices that enables information such as executable instructions and/or other data to be stored and retrieved. Memory device 110 may include one or more computer readable media, such as, without limitation, dynamic random access memory (DRAM), static random access memory (SRAM), a solid state disk, and/or a hard disk. Memory device 110 may be configured to store, without limitation, application source code, application object code, source code portions of interest, object code portions of interest, configuration data, execution events and/or any other type of data.

In some embodiments, computing device 105 includes a presentation interface 120 that is coupled to processor 115. Presentation interface 120 presents information, such as application source code and/or execution events, to a user 125. For example, presentation interface 120 may include a display adapter (not shown in FIG. 1) that may be coupled to a display device, such as a cathode ray tube (CRT), a liquid crystal display (LCD), an organic LED (OLED) display, and/or an "electronic ink" display. In some embodiments, presentation interface 120 includes one or more display devices. In addition to, or in the alternative, presentation interface 120 may include a printer. In some embodiments, presentation interface 120 indicates an execution of one or more source code portions of interest based on execution events associated with the source code portions of interest. For example, presentation interface 120 may be configured to display a source code viewer and/or an execution meter, as described in more detail below.

In some embodiments, computing device 105 includes an input interface 130, such as a user input interface 135 or a communication interface 140. Input interface 130 may be configured to receive an indication of one or more portions of interest within application source code and/or any information suitable for use with the methods described herein.

In the exemplary embodiment, user input interface 135 is coupled to processor 115 and receives input from user 125. User input interface 135 may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of presentation interface 120 and user input interface 135.

Communication interface 140 is coupled to processor 115 and is configured to be coupled in communication with one or more remote devices, such as another computing device 105. For example, communication interface 140 may include, without limitation, a wired network adapter, a wireless network adapter, and/or a mobile telecommunications adapter. Communication interface 140 may also transmit data to one or more remote devices. For example, a communication interface 140 of one computing device 105 may transmit an indication of one or more source code portions of interest and/or one or more execution events to the communication interface 140 of another computing device 105.

Figure 2:
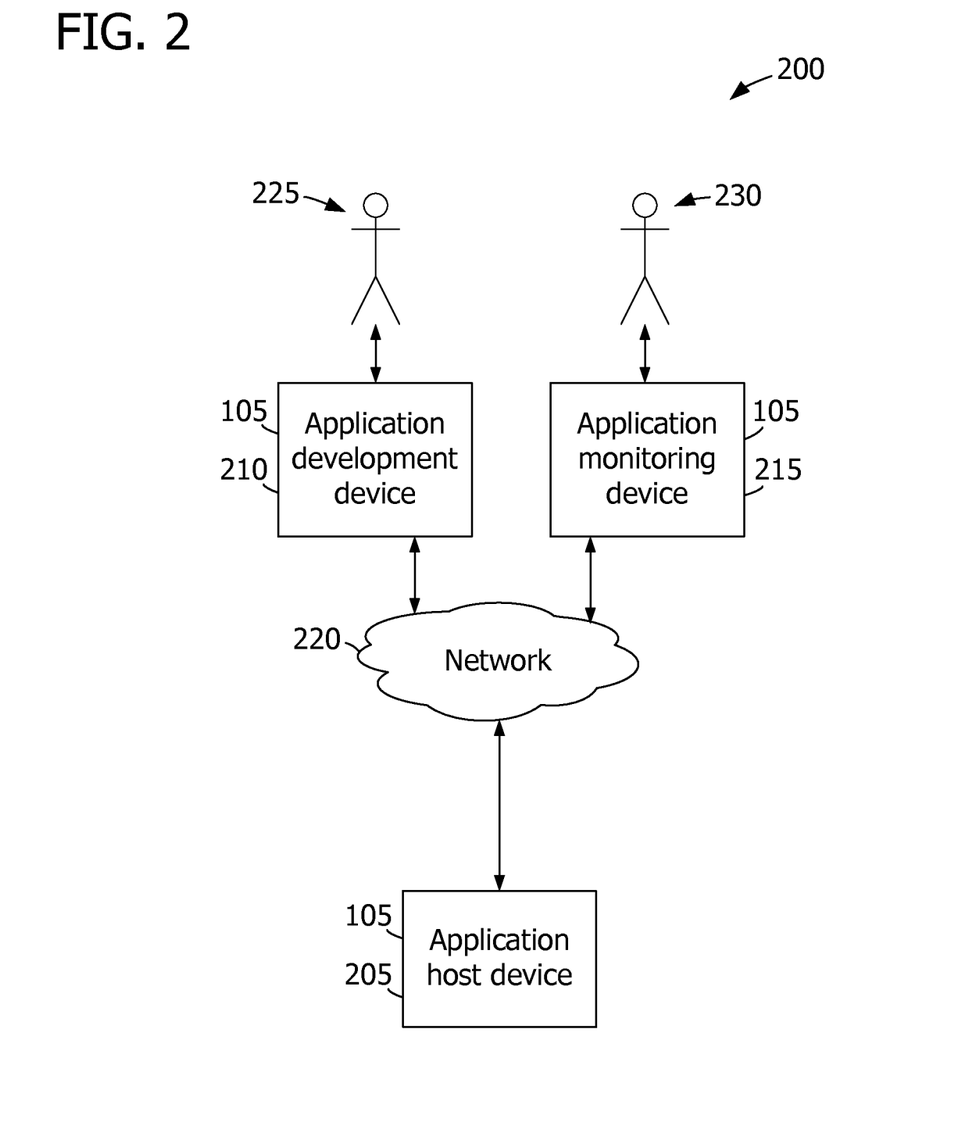
FIG. 2 is block diagram of an exemplary execution tracking system that includes an application host device, an application development device, and an application monitoring device coupled in communication via a network.

FIG. 2 is block diagram of an exemplary system 200 including an application host device 205, an application development device 210, and an application monitoring device 215 coupled in communication via a network 220. Network 220 may include, without limitation, the Internet, a local area network (LAN), a wide area network (WAN), a wireless LAN (WLAN), a mesh network, and/or a virtual private network (VPN).

Application host device 205, application development device 210, and application monitoring device 215 are computing devices 105 (shown in FIG. 1). In the exemplary embodiment, each computing device 105 is coupled to network 220 via communication interface 140. In an alternative embodiment, application host device 205 is integrated with application development device 210 and/or with application monitoring device 215.

Application development device 210 interacts with an application developer 225 (e.g., via user input interface 135 and/or presentation interface 120). For example, application development device 210 may be configured to receive application source code from application developer 225. Application development device 210 transmits the application source code to application host device 205 via network 220.

Application host device 205 receives and stores the application source code (e.g., in memory device 110). Application host device 205 may also be configured to generate application object code based on the application source code.

Application monitoring device 215 interacts with an application monitor 230 (e.g., via user input interface 135 and/or presentation interface 120). In one embodiment, application monitoring device 215 receives an indication of one or more source code portions of interest from application monitor 230 and transmits the indication of source code portions of interest to application host device 205. For example, application monitor 230 may enter an indication that each human-readable statement of the application source code is a source code portion of interest.

Figure 3:
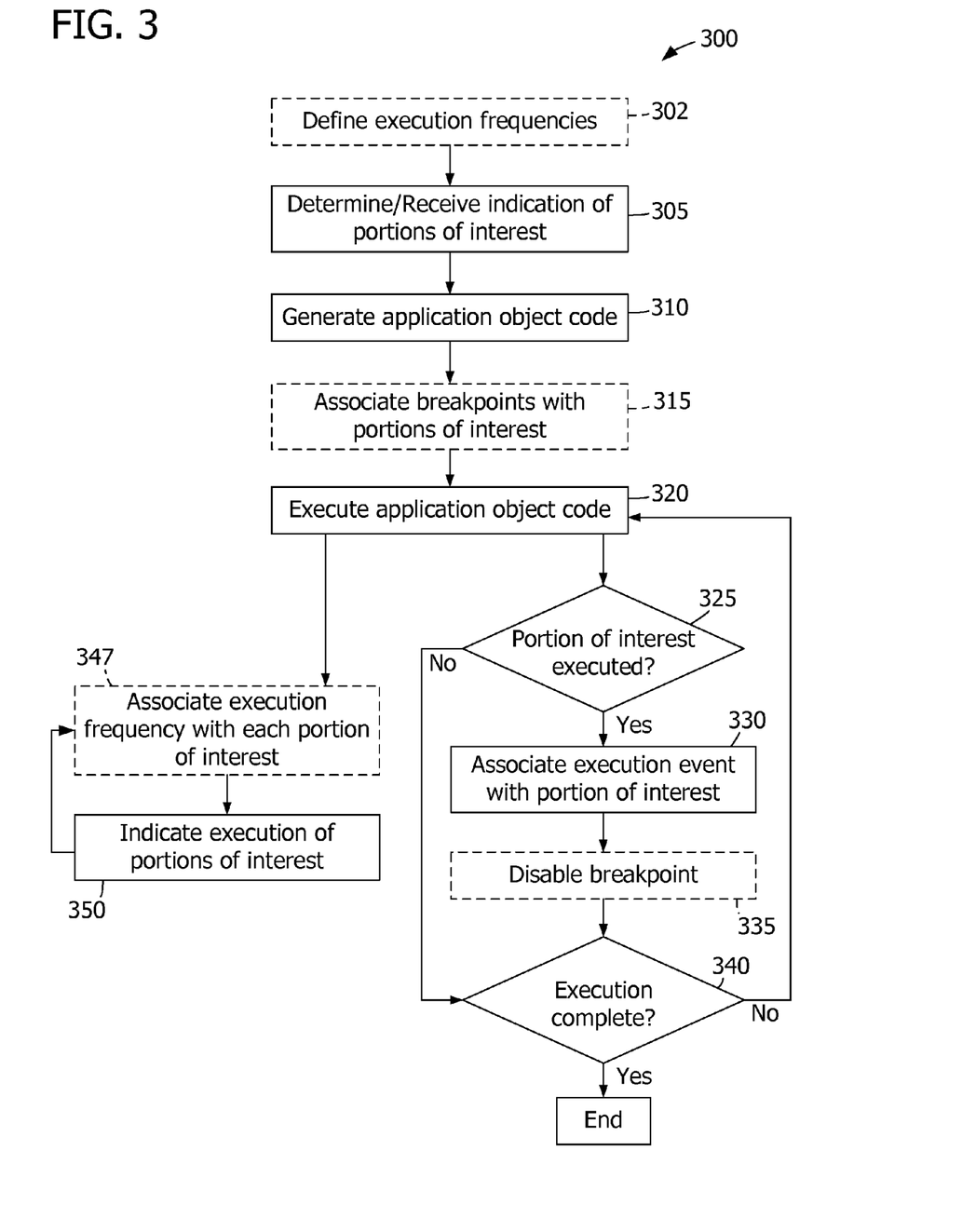
FIG. 3 is a flowchart of an exemplary method for use in indicating an execution of one or more source code portions of interest.
Figure 4:
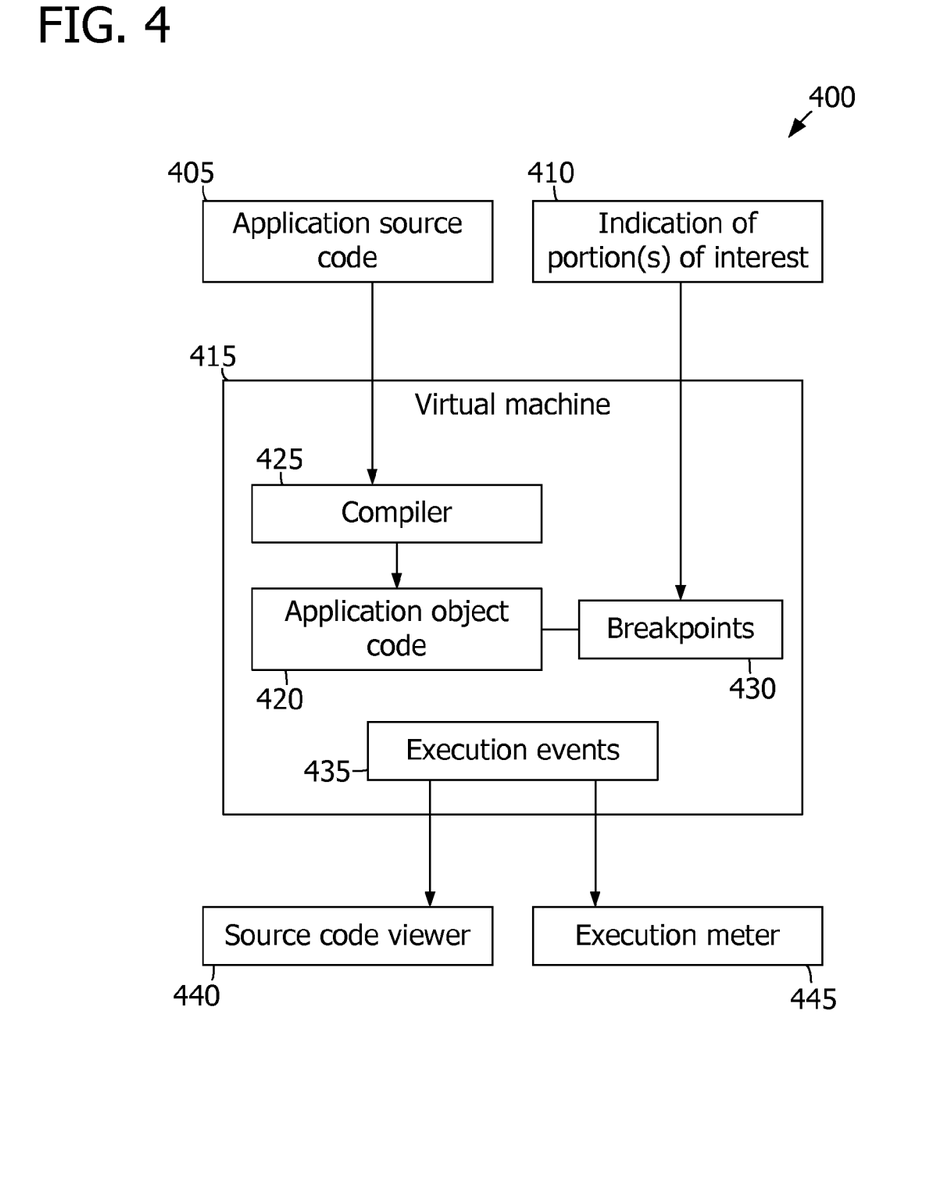
FIG. 4 is an exemplary diagram of data flow that may occur using the method shown in FIG. 3.

Application host device 205 receives the indication of the source code portions of interest, executes the application object code, and associates execution events with the source code portions of interest, as described in more detail with regard to FIGS. 3 and 4. Application host device 205 and/or application monitoring device 215 may also generate and/or present one or more graphical user interfaces indicating an execution of the source code portions of interest.

In some embodiments, application monitoring device 215 is remote to application host device 205. For example, application monitoring device 215 may be located at a support facility that is geographically removed from application host device 205. Such embodiments facilitate remotely defining source code portions of interest and monitoring execution events. For example, application monitor 230 may remotely monitor live execution activity at application host device 205 operated by a customer of application monitor 230.

Figure 5:
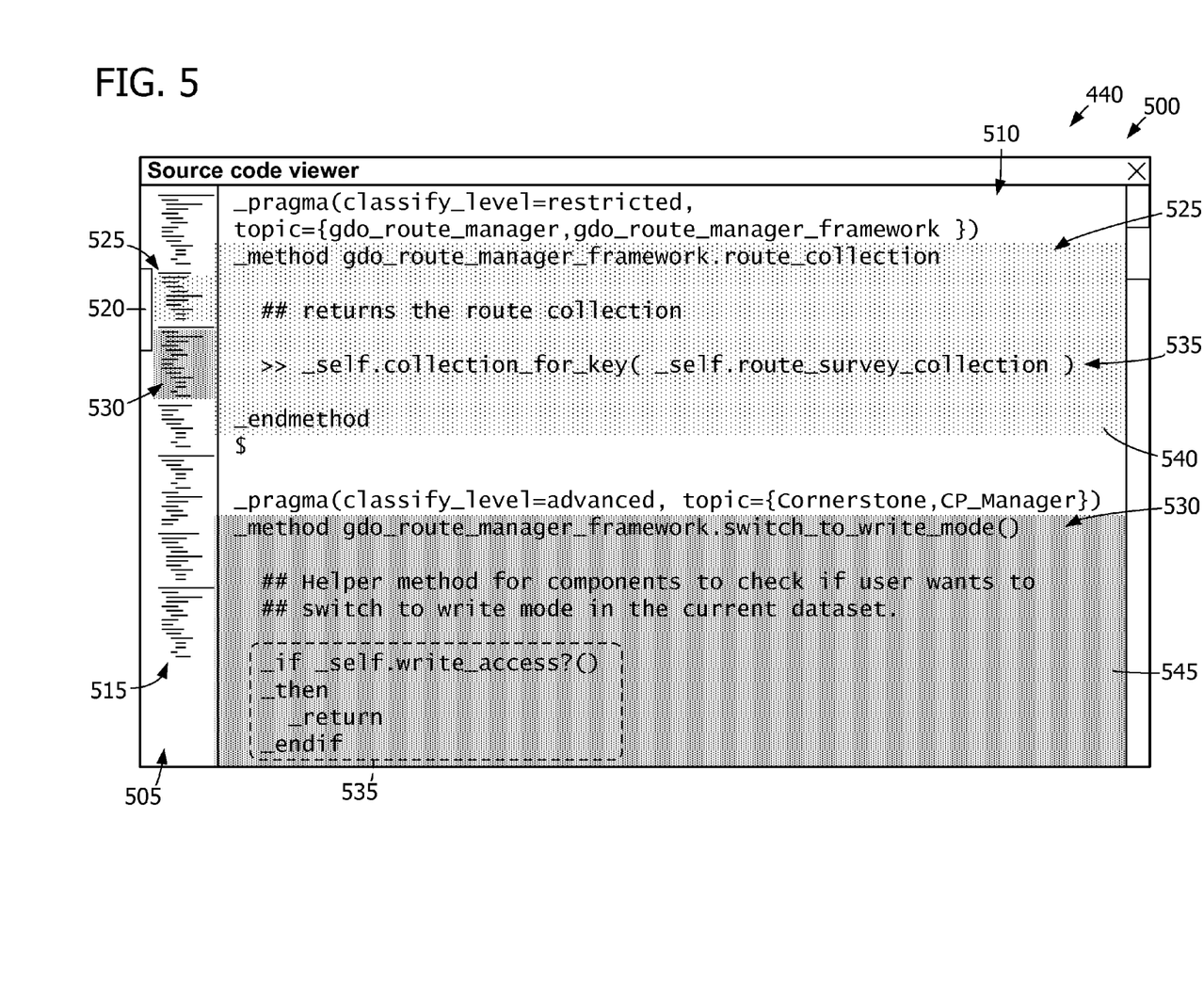
FIG. 5 is an exemplary source code viewer that may be used with the system shown in FIG. 2.
Figure 6:
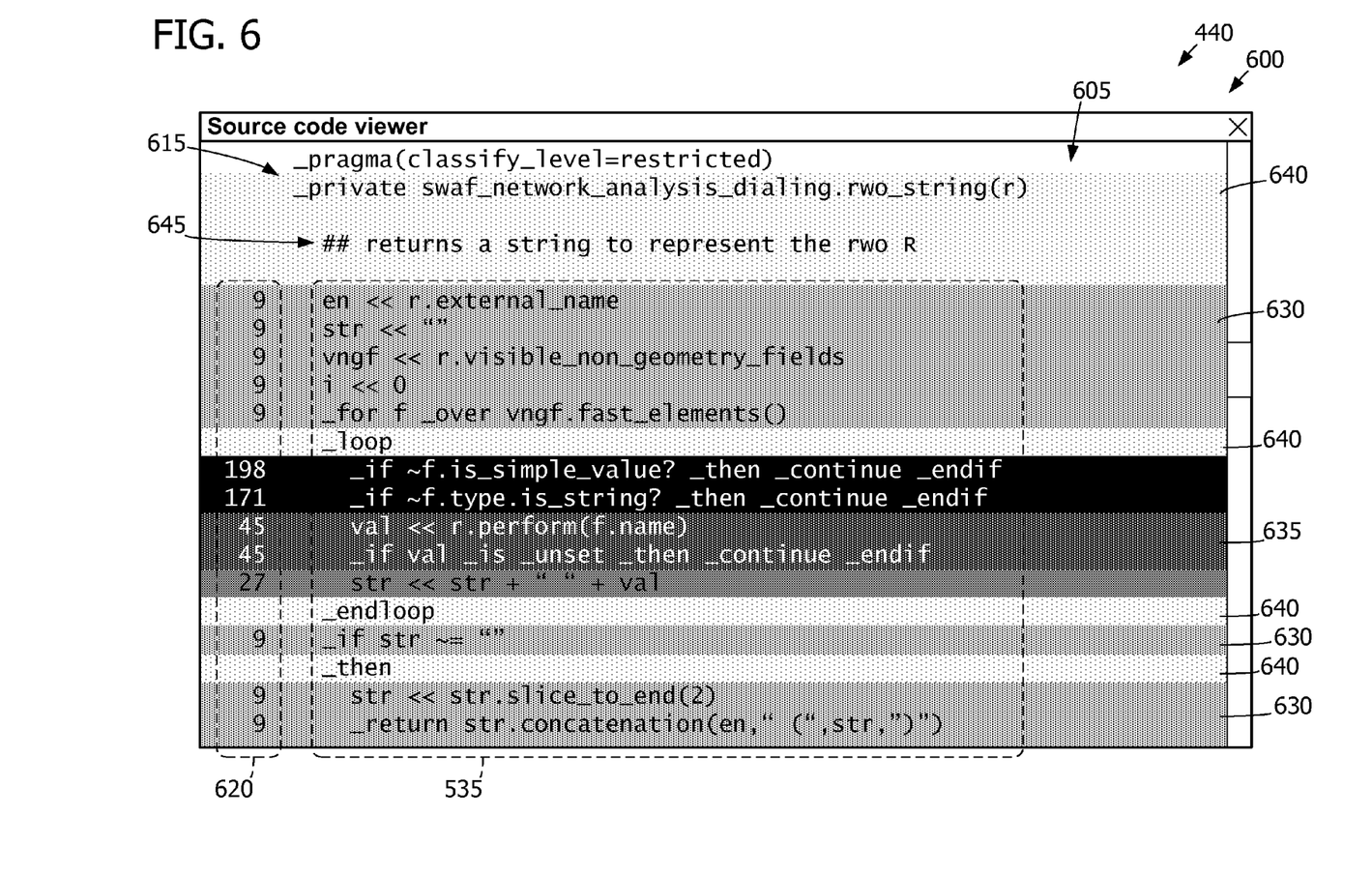
FIG. 6 is an alternative source code viewer that may be used with the system shown in FIG. 2.
Figure 7:
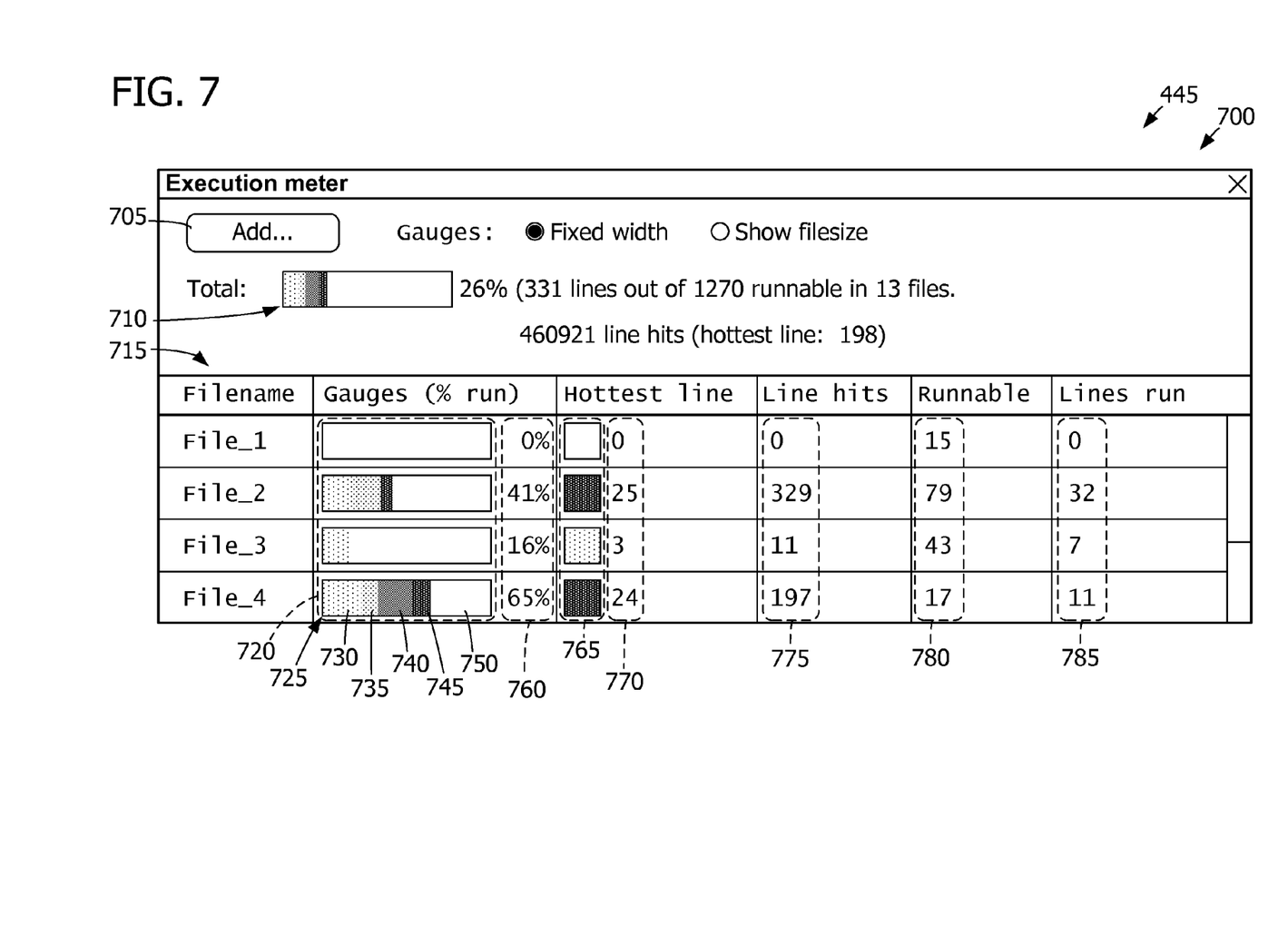
FIG. 7 is an exemplary execution meter that may be used with the system shown in FIG. 2.

FIG. 3 is a flowchart of an exemplary method 300 for use in indicating an execution of one or more source code portions of interest. FIG. 4 is an exemplary diagram 400 of data flow that may occur using method 300. FIGS. 5-7 are exemplary user interfaces for use with method 300 and are explained in more detail below.

Portions of method 300 may be performed, for example, using any one of or any combination of computing devices 105 in system 200. In the exemplary embodiment, one or more portions of interest (e.g., human-readable statements, methods, classes, and/or packages) are determined 305 within application source code 405. For example, the source code portions of interest may be determined 305 by receiving an indication 410 of the source code portions of interest via an input device. Indication 410 may include, for example, a selection of source code portions of interest entered via a user input device, a selection of a predefined monitoring configuration, and/or a monitoring configuration file. In addition to, or in the alternative, source code portions of interest may be determined 305 automatically by a processor. For example, a processor may be programmed to identify each human-readable statement in application source code 405 or a subset of application source code 405 as a source code portion of interest. In one embodiment, each human-readable statement within application source code 405 is a source code portion of interest.

A virtual machine 415 executed by a processor generates 310 application object code 420 based on application source code 405. Application object code 420 includes a plurality of computer-executable instructions and a plurality of object code portions of interest corresponding to the source code portions of interest. For example, an object code portion of interest may include one or more computer-executable instructions corresponding to a human-readable statement of application source code 405. In an exemplary embodiment, virtual machine 415 executes a compiler 425 to generate 310 application object code 420.

Virtual machine 415 associates 315 an execution detection means, such as an execution breakpoint 430, with each object code portion of interest. For example, an execution breakpoint 430 may be associated with application object code 420 at, or prior to, each set of computer-executable instructions corresponding to a source code portion of interest. In an alternative embodiment, virtual machine 415 associates 315 an execution detection means by modifying application object code 420 to include and/or to reference predefined computer-executable instructions (e.g., execution event logging instructions) at, or prior to, each set of computer-executable instructions corresponding to a source code portion of interest.

Virtual machine 415 executes 320 at least a portion of application object code 420. During execution 320, virtual machine 415 determines 325 whether execution 320 of an object code portion of interest is occurring, pending, and/or imminent. For example, virtual machine 415 may halt execution 320 of application object code 420 when an execution breakpoint 430 is reached. An execution event 435 is associated 330 with the source code portion of interest corresponding to the object code portion of interest. In one embodiment, an execution event 435 associated with the source code portion of interest is stored in a memory device and may include a timestamp indicating a time at which the execution 320 was created and/or at which the corresponding object code portion of interest was executed. In an alternative embodiment, each source code portion of interest is associated with a quantity of executions 320 (an "execution count") in a memory device, and associating 330 an execution event 435 with a source code portion of interest includes incrementing the associated execution count. Execution events 435 may be created as application data structures, records in a database, structured text (e.g., extensible markup language), plain text (e.g., delimited values or fixed-width values), and/or in any other form suitable for use with the methods described herein.

In some embodiments, the execution breakpoint 430 is disabled 335 (e.g., deactivated and/or removed). Disabling 335 execution breakpoints 430 as execution events 435 are associated with object code portions of interest facilitates increasing the speed of executing 320 application object code 420. For example, virtual machine 415 may determine 325 an object code portion of interest is being executed based on the existence of a breakpoint 430 associated with a computer-executable instruction being executed. In such an example, disabling 335 breakpoints 430 causes virtual machine 415 to associate 330 at most one execution event 435 with an object code portion of interest and to bypass the associating 330 step on subsequent executions 320 of the object code portion of interest.

In other embodiments, an execution event 435 is associated 330 with an object code portion of interest each time the object code portion of interest is executed. Such embodiments facilitate determining how frequently an object code portion of interest has been executed, as described in more detail below.

Regardless of whether an object code portion of interest is executed, virtual machine 415 determines 340 whether execution 320 of application object code 420 is complete. For example, execution 320 may be complete after an application finishes processing an input data set, after an application receives a termination request, and/or after an application encounters a fatal error. If virtual machine 415 determines 340 that execution 320 is not complete, virtual machine 415 continues executing 320 application object code 420.

During or after execution 320 of application object code 420, the execution 320 of source code portions of interest is indicated 350. In an exemplary embodiment, execution events 435 are used to indicate 350 execution 320 of source code portions of interest in a graphical user interface, such as a source code viewer 440 and/or an execution meter 445, which may be displayed to a user via a presentation interface. Source code viewer 440 is described below with regard to FIGS. 5 and 6. Execution meter 445 is described below with regard to FIG. 7.

Some embodiments graphically distinguish source code portions of interest based on associated execution events 435. For example, a source code portion of interest associated with an execution event 435 may be displayed with a first background color, and a source code portion of interest not associated with an execution event 435 may be displayed with a different background color. The quantity of execution events 435 associated with a source code portion of interest may be determined, for example, by determining a quantity of discrete execution events (e.g., including a timestamp) associated with the source code portion of interest and/or by identifying an execution count associated with the source code portion of interest.

Some embodiments enable indicating how frequently a source code portion of interest is executed in application object code form. In such embodiments, an execution event 435 is associated 330 with a source code portion of interest for each execution of the corresponding object code portion of interest (e.g., by creating a discrete execution event and/or by incrementing an execution count). A quantity of execution events 435 associated with a source code portion of interest is indicated 350. In some embodiments, an absolute quantity of execution events is indicated 350. For example, twelve executions may be indicated 350 for a source code portion of interest associated with twelve execution events.

In addition to, or in the alternative, an execution frequency may be indicated 350 for a source code portion of interest. In some embodiments, a plurality of execution frequencies is defined 302. For example, execution frequencies may be predefined and stored in a memory device and/or defined during execution of application object code 420. Each execution frequency corresponds to a range of execution event quantities. An execution frequency may include, for example, a never-executed frequency corresponding to zero execution events, an executed-once frequency corresponding to a single execution event, and/or a repeatedly-executed frequency corresponding to two or more execution events. In one embodiment, execution frequencies are defined as follows:

TABLE 1

| Execution Frequency | Quantity of Execution Events |
| --- | --- |
| 1 | 0 |
| 2 | 1-5 |
| 3 | 6-12 |
| 4 | 13-20 |
| 5 | 21-50 |
| 6 | 51 or more |

While specific numeric ranges are described above, any number of execution frequencies corresponding to any ranges of execution event quantities may be defined 302.

Prior to indicating 350 execution of source code portions of interest, an execution frequency may be associated 347 with each source code portion of interest. For example, an execution frequency may be determined based on an execution count and/or a quantity of execution events 435 associated with the source code portion of interest.

In some embodiments, a presentation interface is configured to indicate 350 the execution of one or more source code portions of interest while virtual machine 415 executes 320 application object code 420. For example, the presentation interface may be configured to repeatedly indicate 350 the execution of a source code portion of interest, updating a graphical interface as the quantity of execution events associated with the source code portion of interest increases. Furthermore, the presentation interface may be configured to indicate an execution of a first source code portion of interest corresponding to a first object code portion of interest was executed while virtual machine 415 executes 320 a second object code portion of interest.

In some embodiments, an indication of one or more portions of interest is received 305 while virtual machine 415 executes 320 application object code 420. Virtual machine 415 generates 310 and/or associates 315 breakpoints 430 with application object code 420 corresponding to the indicated portions of interest without terminating execution 320 of application object code 420. For example, virtual machine 415 may halt execution 320 of at least a portion of application object code 420, recompile and/or reload one or more classes corresponding to the indicated portions of interest, and/or resume execution 320 of application object code 420.

FIG. 5 is an exemplary source code viewer 500 that may be used with a computing device, such as application development device 210 and/or application monitoring device 215 (shown in FIG. 2), in accordance with method 300 (shown in FIG. 3). In an exemplary embodiment, source code viewer 500 is presented to application monitor 230 via presentation interface 120 (shown in FIG. 1) and is used to receive input from application monitor 230 via user input interface 135.

Source code viewer 500 includes a summary pane 505 and a detail pane 510. Summary pane 505 includes a summary or "thumbnail" image 515 of application source code in a file and a visible portion indicator 520 indicating a portion of the file that is visible within detail pane 510. In one embodiment, the file includes a plurality of source code portions of interest (e.g., human-readable statements, methods, and/or classes), and detail pane 510 includes a subset of the source code portions of interest.

Included in summary pane 505 and detail pane 510 are a first method 525 and a second method 530, each including one or more human-readable statements 535. First method 525 is displayed with a first background pattern 540, and second method 530 is displayed with a second background pattern 545 to graphically distinguish second method 530 from first method 525. First background pattern 540 and second background pattern 545 are shown in both summary pane 505 and detail pane 510.

In one embodiment, first method 525 and second method 530 are each a source code portion of interest that may be associated with one or more execution events. For example, an execution event is associated with first method 525 when any computer-executable instruction corresponding to first method 525 is executed. In an alternative embodiment, each human-readable statement 535 is a source code portion of interest. A quantity of execution events for first method 525 is determined based on the execution events associated with the human-readable statements 535 within first method 525. For example, the quantity of execution events for first method 525 may be calculated based on a sum, an average, a minimum, and/or a maximum of execution events associated with human-readable statements 535 within first method 525. Similarly, execution events associated with human-readable statements may be grouped by class, package, and/or application.

In one embodiment, source code viewer 500 employs graphical distinction (e.g., first background pattern 540 and second background pattern 545) to indicate that first method 525 is associated with one or more execution events, whereas second method 530 is not associated with an execution event. In another embodiment, such graphical distinction is used to indicate that first method 525 and second method 530 are associated with different quantities of execution events and/or different execution frequencies. In yet another embodiment, first background pattern 540 indicates that first method 525 is associated with a recent execution event and/or currently executing object code. For example, a recent execution event may be defined as an increment to an execution count and/or a creation of a discrete execution event within a predefined duration (e.g., 10 seconds, 30 seconds, 60 seconds, and/or 3 minutes) prior to the current time. Furthermore, the methods of graphical distinction described above may be combined.

In one embodiment, source code viewer 500 repeatedly (e.g., periodically, upon notification of an execution event, or upon a request from a user) updates summary pane 505 and/or detail pane 510 while application object code is executed. In such an embodiment, if a first source code portion of interest that is not associated with an execution event at a first time becomes associated with an execution event at a subsequent time, the first source code portion of interest is graphically distinguished from other source code portions of interest that remain unassociated with an execution event. Furthermore, for a predefined duration, the first source code portion of interest may be graphically distinguished from other source code portions of interest that were already associated with an execution event.

As illustrated by FIG. 5, graphical distinction may be achieved by applying a background pattern. In addition, or alternatively, graphical distinction may be achieved by applying a color (e.g., a background color or a foreground color), a line pattern, a line weight, a typeface, a font weight, an animation (e.g., fading and/or blinking), a proximately positioned icon, and/or any other suitable means for distinguishing graphical elements from one another.

FIG. 6 is a second exemplary source code viewer 600 that may be used with a computing device, such as application development device 210 and/or application monitoring device 215 (shown in FIG. 2), in accordance with method 300 (shown in FIG. 3). Source code viewer 600 includes a detail pane 605 showing a portion of a file containing application source code. Specifically, detail pane 605 shows a plurality of human-readable statements 535 within a method 615. Each human-readable statement 535 represents a source code portion of interest.

Adjacent to the human-readable statements 535 are corresponding execution counts 620. Execution counts 620 may be directly associated with human-readable statements 535 and incremented each time associated human-readable statement 535 is executed. In addition to, or in the alternative, execution counts 620 may be determined by counting a quantity of execution events associated with human-readable statements 535.

Human-readable statements 535 are graphically distinguished based on associated execution frequencies. For example, a first background pattern 630 is applied to human-readable statements 535 associated with a first execution frequency corresponding to a first range of execution counts 620 (e.g., 6 to 12 execution events). A second background pattern 635 is applied to human-readable statements 535 associated with a second execution frequency corresponding to a second range of execution counts 620 (e.g., 21 to 50 execution events). In addition, a third background pattern 640 is applied to portions of method 615 that do not correspond to computer-executable instructions in the application object code, such as a comment 645.

Similar to source code viewer 500, source code viewer 600 may be repeatedly updated. Such an embodiment facilitates real-time monitoring of execution activity.

FIG. 7 is an exemplary execution meter 700 that may be used with a computing device, such as application development device 210 and/or application monitoring device 215, in accordance with method 300. Execution meter 700 includes an add button 705 for defining source code portions of interest and a summary execution gauge 710 indicating an proportion of source code portions of interest (e.g., human-readable statements) associated with each of a plurality of execution frequencies. In an alternative embodiment, summary execution gauge 710 indicates a proportion of source code portions of interest associated with at least one execution event.

Execution meter 700 also includes a table 715 with detailed execution gauges 720 for a plurality of files. Detailed execution gauges 720 indicate a proportion of source code portions of interest within each file that are associated with each execution frequency. For example, the fourth detailed execution gauge 725 includes a first block 730, a second block 735, a third block 740, and a fourth block 745, each representing a proportion of source code portions of interest within the file that are associated with a particular execution frequency. In addition, fourth detailed execution gauge 725 includes an empty block 750 representing a proportion of source code portions of interest associated with no execution events and/or a never-executed frequency. Each block 730, 735 740, 745, 750 is depicted with a unique fill pattern, facilitating graphical distinction between proportions of source code portions of interest associated with each execution frequency. Adjacent to detailed execution gauges 720 are proportions executed 760, which numerically indicate a proportion of source code portions of interest within each file that are associated with at least one execution event.

Table 715 also includes, for the source code portions of interest in each file, a maximum execution count icon 765, a maximum execution count 770, a total execution count 775, an executable source code portion of interest count 780 (e.g., indicating a quantity of source code portions of interest that are executable as application object code), and an executed source code portion of interest count 785 (e.g., indicating a quantity of executable source code portions of interest that are associated with at least one execution event).

In some embodiments, execution meter 700 is repeatedly updated while application object code is executed. Such embodiments facilitate real-time monitoring of execution activity.

Execution meter 700 is shown with source code portions of interest representing human-readable statements, grouped by file. In addition to, or in the alternative, source code portions of interest may be displayed by method, by file, by class, and/or by package. Furthermore, source code portions of interest may defined as methods, classes, files, and/or packages.

Embodiments provided herein facilitate indicating which portions of application source code are executed while an application is being tested or executed in a live or "production" context. Such indications enable identification of critical portions of application source code, such as untested source code, insufficiently tested source code, and/or source code that is frequently executed. Once identified, critical portions may be subjected to additional automated testing, performance optimization, and/or additional scrutiny when modified (e.g., refactored). Moreover, execution information may be used to identify source code that is never executed and to eliminate such source code, thereby reducing maintenance effort and/or costs associated with the application. Embodiments described herein further allow for definition of source code portions of interest and monitoring of execution activity while application object code is being executed without the delay and inconvenience associated with terminating and restarting execution of the application object code.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other apparatus and methods.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

While the invention has been described in terms of various specific embodiments, those skilled in the art will recognize that the invention may be practiced with modification within the spirit and scope of the claims.

What is claimed is:

1. A method for use in indicating an execution of application source code, said method comprising:
defining a plurality of execution frequencies including a never-executed frequency, an executed-once frequency, and an executed-repeatedly frequency;
receiving, from a user prior to the execution of the application source code, a plurality of source code portions of interest;
generating, by the processor, application object code based on the application source code, wherein the application object code includes at least a plurality of computer executable instructions and a plurality of object code portions of interest corresponding to a plurality of source code portions of interest;
executing the application object code by the processor;
generating an execution event record with the corresponding source code portion of interest in a memory device for each execution of an object code portion of interest, wherein the execution event record includes at least one of an execution counter, associated with a number of executions of the object code portion of interest, being incremented and an execution timestamp;
associating, by the processor, an execution frequency with each source code portion of interest based on a quantity of execution event records associated with the source code portion of interest; and
displaying a first proportion of source code portions of interest associated with the executed-repeatedly frequency graphically distinguishably from a second proportion of source code portions of interest associated with the executed-once frequency.

2. A method according to claim 1, further comprising displaying a proportion of the source code portions of interest that are associated with each execution frequency of the plurality of execution frequencies.

3. A method according to claim 2, further comprising repeatedly updating the displayed proportions while executing the application object code.

4. A method according to claim 1, wherein defining the plurality of execution frequencies further comprises defining the never-executed frequency as corresponding to zero execution event records, the executed-once frequency as corresponding to one execution event record, and the repeatedly-executed frequency as corresponding to two or more execution events records.

5. A system for use in indicating an execution of application source code, said system comprising:
an input interface configured to receive, from a user prior to the execution of the application source code, an identification of a source code portion of interest within the application source code, wherein the application source code includes at least a plurality of human-readable statements that describe a plurality of operations;
a processor coupled to said input interface and programmed to:

define a plurality of execution frequencies including a never-executed frequency, an executed-once frequency, and an executed-repeatedly frequency;
generate application object code based on the application source code, wherein the application object code includes at least a plurality of computer executable instructions and an object code portion of interest corresponding to the source code portion of interest;
execute the application object code; and
generate an execution event record in a memory device for each execution of the object code portion of interest, wherein the execution event record includes at least one of an execution counter, associated with a number of executions of the object code portion of interest, being incremented and an execution timestamp; and
a presentation interface configured to indicate a quantity of execution event records generated for the source code portion of interest corresponding to the object code portion of interest based on at least one of the execution counter and a quantity of execution timestamps and further configured to graphically distinguish a first proportion of source code portions of interest associated with the executed-repeatedly frequency from a second proportion of source code portions of interest associated with the executed-once frequency.

6. A system according to claim 5, wherein the source code portion of interest is a first source code portion of interest, and the presentation interface is further configured to graphically distinguish the first source code portion of interest from a second source code portion of interest not associated with an execution event record.

7. A system according to claim 6, wherein the first source code portion of interest is associated with a plurality of execution event records, and the presentation interface is further configured to graphically distinguish the first source code portion of interest from a second source code portion of interest associated with one execution event record.

8. A system according to claim 5, wherein the object code portion of interest is a first portion of the application object code, and said presentation interface is configured to indicate that the source code portion of interest was executed while said processor executes a second portion of the application object code.

9. A system according to claim 5, wherein said input interface is further configured to receive the identification of the source code portion of interest while said processor executes the application object code, and said processor is further programmed to associate an execution breakpoint with the object code portion of interest without terminating execution of the application object code.

10. A system according to claim 5, wherein said input interface is configured to receive an identification of at least one source code portion of interest corresponding to one human-readable statement within the application source code.

11. A system according to claim 5, wherein the presentation interface is further configured to indicate for the source code portion of interest, at least one of a maximum execution count and a total execution count.

12. A system according to claim 5, wherein said processor is further programmed to associate an execution frequency with each source code portion of interest of the plurality of source code portions of interest based on the associated quantity of execution events.

13. A system for use in indicating an execution of application source code, said system comprising:
a memory device configured to store application source code and application object code, wherein the application source code includes at least a plurality of human-readable statements that describe a plurality of operations, and the application object code includes at least a plurality of computer executable instructions corresponding to the plurality of human-readable statements;
a processor coupled to said memory device and programmed to:
receive, from a user prior to the execution of the application source code, a plurality of source code portions of interest within the application source code;
determine an object code portion of interest corresponding to each source code portion of interest of the plurality of source code portions of interest;
execute the application object code;
define a plurality of execution frequencies including a never-executed frequency, an executed-once frequency, and an executed-repeatedly frequency; and
generate an execution event record with the corresponding source code portion of interest in a memory device for each execution of the object code portion of interest, wherein the execution event record includes at least one of an execution counter, associated with a number of executions of the object code portion of interest, being incremented and an execution timestamp; and
a presentation interface configured to indicate a quantity of execution event records generated for a first source code portion of interest corresponding to a first object code portion of interest based on at least one of the execution counter and a quantity of execution timestamps and further configured to graphically distinguish a first proportion of source code portions of interest associated with the executed-repeatedly frequency from a second proportion of source code portions of interest associated with the executed-once frequency.

14. A system according to claim 13, wherein said presentation interface is configured to indicate the quantity of execution event records by graphically distinguishing the first source code portion of interest from a second source code portion of interest associated with a different quantity of execution event-records.

15. A system according to claim 13, further comprising a presentation interface coupled to said processor and configured to indicate a proportion of the human-readable statements that have been executed based at least in part on one or more execution event records in said memory device.

16. A system according to claim 15, wherein said presentation interface is configured to repeatedly update the indicated proportion of the human-readable statements that have been executed while said processor executes the application object code.

17. A system according to claim 13, wherein said processor is further programmed to
associate an execution frequency with each source code portion of interest of the plurality of source code portions of interest based on the associated quantity of execution events.

18. A system according to claim 17, further comprising a presentation interface configured to display a proportion of source code portions of interest associated with each execution frequency of the plurality of execution frequencies.

19. A system according to claim 13, further comprising an input interface coupled to said processor and configured to receive the plurality of source code portions of interest, wherein each source code portion of interest corresponds to a human-readable statement of the plurality of human-readable statements within the application source code.

20. A system according to claim 13, wherein the presentation interface is further configured to indicate for the source code portions of interest, at least one of a maximum execution count and a total execution count, an executable source code portion of interest count indicating a quantity of source code portions of interest that are executable as application object code, and an executed source code portion of interest count indicating a quantity of executable source code portions of interest that are associated with at least one execution event.

* * * * *